US008799302B2

(12) United States Patent
Singerman et al.

(10) Patent No.: US 8,799,302 B2
(45) Date of Patent: Aug. 5, 2014

(54) RECOMMENDED ALERTS

(75) Inventors: Brian A. Singerman, San Francisco, CA (US); Naga Sridhar Kataru, Stockton, CA (US); Adam D. Smith, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1337 days.

(21) Appl. No.: 11/323,870

(22) Filed: Dec. 29, 2005

(65) Prior Publication Data

US 2007/0168342 A1    Jul. 19, 2007

(51) Int. Cl.
*G06F 17/30* (2006.01)

(52) U.S. Cl.
USPC ............................................ 707/758; 707/706

(58) Field of Classification Search
CPC ............... G06F 17/30867; G06F 17/30761; G06F 17/30035; G06F 17/30864; G06F 17/30; G06F 17/30525; G06F 17/30023; G06F 17/30861
See application file for complete search history.

(56) References Cited

U.S. PATENT DOCUMENTS

| | | | |
|---|---|---|---|
| 6,006,225 A | 12/1999 | Bowman et al. | 707/5 |
| 6,064,980 A | 5/2000 | Jacobi et al. | 705/26 |
| 6,169,986 B1 | 1/2001 | Bowman et al. | 707/5 |
| 6,185,558 B1 | 2/2001 | Bowman et al. | 707/5 |
| 6,266,649 B1 | 7/2001 | Linden et al. | 705/26 |
| 6,490,584 B2 * | 12/2002 | Barrett et al. | 707/10 |
| 6,549,904 B1 | 4/2003 | Ortega et al. | 707/10 |
| 6,681,369 B2 * | 1/2004 | Meunier et al. | 715/255 |
| 6,691,106 B1 | 2/2004 | Sathyanarayan | 707/3 |
| 6,714,926 B1 | 3/2004 | Benson | 707/2 |
| 6,845,374 B1 * | 1/2005 | Oliver et al. | 707/5 |
| 6,853,982 B2 | 2/2005 | Smith et al. | 705/27 |
| 6,865,546 B1 | 3/2005 | Song | 705/26 |
| 6,981,040 B1 * | 12/2005 | Konig et al. | 709/224 |
| 7,054,900 B1 * | 5/2006 | Goldston | 709/203 |
| 7,103,592 B2 * | 9/2006 | Huret | 707/3 |
| 7,143,118 B2 * | 11/2006 | Eichstaedt et al. | 1/1 |
| 7,146,416 B1 * | 12/2006 | Yoo et al. | 709/224 |
| 7,181,438 B1 * | 2/2007 | Szabo | 707/2 |
| 7,209,895 B2 * | 4/2007 | Kundtz et al. | 705/26 |
| 7,266,510 B1 * | 9/2007 | Cofino et al. | 705/26 |
| 7,318,056 B2 * | 1/2008 | Taniguchi et al. | 707/3 |
| 7,403,990 B2 * | 7/2008 | Nishiyama et al. | 709/223 |
| 7,433,836 B1 * | 10/2008 | August et al. | 705/34 |
| 7,523,173 B2 * | 4/2009 | Seki et al. | 709/219 |
| 7,581,237 B1 * | 8/2009 | Kurapati | 725/46 |
| 2002/0107758 A1 * | 8/2002 | Takakura et al. | 705/26 |
| 2003/0065636 A1 * | 4/2003 | Peyrelevade | 706/62 |

(Continued)

FOREIGN PATENT DOCUMENTS

EP          1550956          7/2005

OTHER PUBLICATIONS

International Search Report for International Application No. PCT/US2006/062684, mailed May 24, 2007.

(Continued)

*Primary Examiner* — Michelle Owyang

(74) *Attorney, Agent, or Firm* — Morgan, Lewis & Bockius LLP

(57) ABSTRACT

A method of providing content to a user is described. A set of one or more key terms is identified in accordance with user history information. The user is provided an invitation to receive content on an ongoing basis. The content is related to the set of one or more key terms.

26 Claims, 8 Drawing Sheets

(56) References Cited

U.S. PATENT DOCUMENTS

| | | | |
|---|---|---|---|
| 2004/0010484 A1* | 1/2004 | Foulger et al. | 706/50 |
| 2004/0044658 A1* | 3/2004 | Crabtree et al. | 707/3 |
| 2004/0044690 A1* | 3/2004 | Kanzinger | 707/104.1 |
| 2004/0093274 A1* | 5/2004 | Vanska et al. | 705/26 |
| 2004/0122735 A1 | 6/2004 | Meshkin | 705/14 |
| 2004/0181604 A1* | 9/2004 | Immonen | 709/232 |
| 2005/0004781 A1* | 1/2005 | Price et al. | 702/188 |
| 2005/0010857 A1* | 1/2005 | Shmukler et al. | 715/500 |
| 2005/0102202 A1* | 5/2005 | Linden et al. | 705/27 |
| 2005/0125408 A1* | 6/2005 | Somaroo et al. | 707/10 |
| 2005/0154723 A1* | 7/2005 | Liang | 707/3 |
| 2005/0216823 A1* | 9/2005 | Petersen et al. | 715/501.1 |
| 2006/0271548 A1* | 11/2006 | Maes | 707/10 |
| 2006/0282304 A1* | 12/2006 | Bedard et al. | 705/10 |

OTHER PUBLICATIONS

Podnar, I., et al., "Mobile Push: Delivering Content to Mobile Users," Proceedings of $22^{nd}$ Int'l Conf. on Distributed Computing Systems, Piscataway, New Jersey, Jul. 2-5, 2002, 6 pages.

Shibata, H., et al. "A Study on Personalized Information Recommending Agents," Proceedings of 2000 Int'l Workshop on Autonomous Decentralized Systems, Chengdu, China, Sep. 21-23, 2000, pp. 28-33.

* cited by examiner

RECOMMENDED ALERTS

FIELD OF THE INVENTION

The present invention relates generally to providing content to a user, and more specifically to providing content to a user based on a user history and preferences.

BACKGROUND

A wide variety of applications running on networked environments, such as the Internet or World Wide Web (WWW), allow users to access to ever-increasing amounts of information. For example, search engines provide a powerful tool for locating content in documents in a large database of documents, such as the documents on the Internet and/or the documents stored on the computers of an Intranet. These applications, however, often depend on a user action or request. For example, a user performs a search using one or more search queries, consisting of one or more words, terms, keywords and/or phrases, henceforth called terms, that are submitted by a user. Many users would like to have information or content that is of interest to them automatically provided to them, with little or no effort on their part. Such an approach to distributing information is sometimes called a "push" method of distributing information, as opposed to information retrieved in response to explicit user commands or queries, which is sometimes referred to as a "pull" or "on demand" method of distributing information.

There is a need, therefore, for an improved approach to providing content to users.

SUMMARY OF EMBODIMENTS

A method of providing content to a user is described. A set of one or more key terms is identified in accordance with user history information. The user is provided an invitation to receive content on an ongoing basis. The content is related to the set of one or more key terms.

In some embodiments, after receiving an acceptance of the invitation, content related to the set of one or more key terms is sent to the user. For instance, as new content matching the one or more key terms is obtained or located by an information service, that content is sent to the user.

The provided content may include a message containing a link to a web page. The invitation provided to the user may include an invitation message sent to the user. The invitation message may identify the set of one or more key terms.

The set of one or more key terms may include a category of information associated with the user history information. The user history information may include a user profile. The user profile may include a set of one or more alert categories that the user has indicated are of interest. The user history information may include a set of web pages visited by the user.

The key terms may be identified in accordance with a user search history, which may include query terms. For instance, the key terms may include one or more recurring search terms in frequently repeated searches.

Alternately, or in addition, the key terms may be identified in accordance with content from one or more computing activities of the user. The one or more computing activities may include any of the following: sending and receiving email messages, visiting web pages, authoring or updating web pages, and downloading content from various web sites or host computers.

The set of one or more key terms may be identified by identifying terms in documents or web pages visited by the user, and selecting the terms having the highest content scores (e.g., the highest term frequency inverse document frequency values). In some embodiments, the set of one or more key terms may be further identified in accordance with a mapping to one or more categories.

The set of one or more key terms may be identified in accordance with a subset of the user history information corresponding to a time interval. The set of one or more key terms may be identified by applying a scoring function to candidate sets of key terms. The scoring function may be determined in accordance with a weighted summation of a term frequency, a category frequency, and an inverse document frequency. In some embodiments, the one or more key terms in the set of key terms may include Boolean expressions that include synonyms for one or more key terms.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

A method and associated apparatus for identifying and providing relevant content to one or more users is described. The relevant content may be provided to the one or more users, including one or more individuals and/or one or more groups of individuals, on an ongoing basis. The relevant content may include a message containing a location, such as a Universal Resource Locator (URL), or a link to a web page or a collection of web pages, such as a website. In some embodiments, the relevant content is related to a set of one or more key terms that are identified for the one or more users. The relevant content may be provided to a respective user after the respective user provides an acceptance of an invitation to receive the relevant content. In some embodiments, the invitation may be provided to the respective user by sending an invitation message to the respective user.

Figure 1:
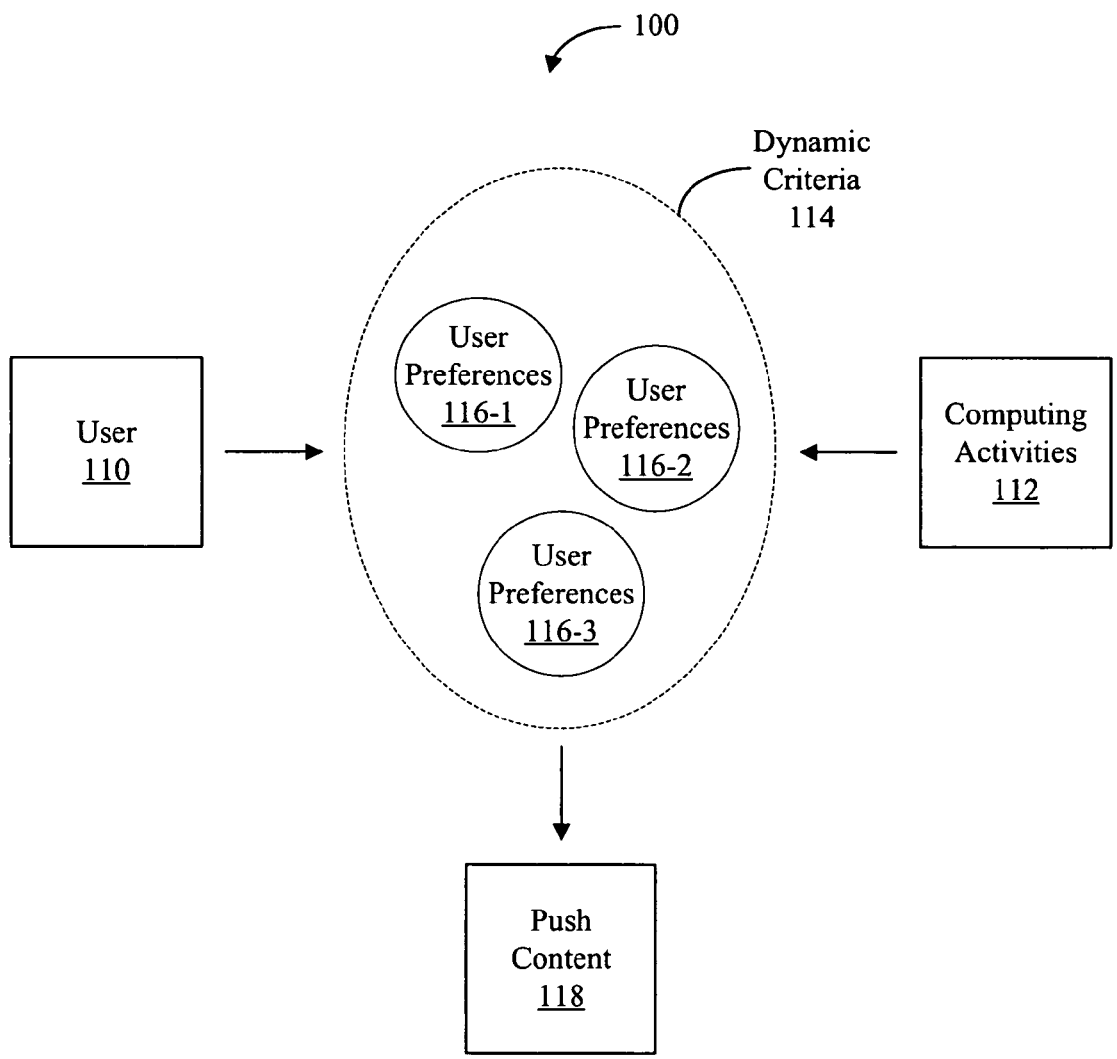
FIG. 1 is a block diagram illustrating an embodiment of providing a user with content.

Attention is now directed towards embodiments of providing relevant content to one or more users. FIG. 1 is a block diagram illustrating an embodiment 100 of providing a user 110 with content 118. The content 118 that is pushed to the user 110 may be identified using dynamic criteria 114. The dynamic criteria 114 may include one or more user preferences 116, as well as history information from one or more computing activities 112 of the user 110.

Figure 2:
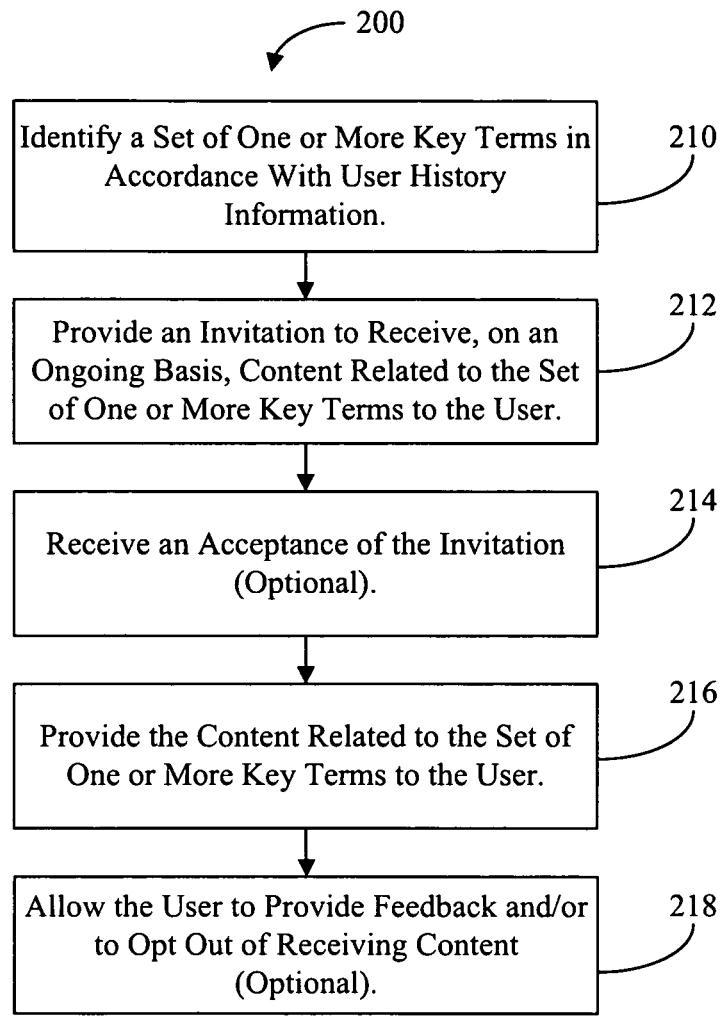
FIG. 2 is a flow diagram illustrating an embodiment of a method of providing a user with content.

FIG. 2 is a flow diagram illustrating an embodiment of a method 200 of providing a user with content. A set of one or more key terms are identified in accordance with the user history information of a user (210). An invitation to receive, on an ongoing basis, content related to the set of one or more key terms is provided to the user (212). For the purposes of this explanation, we will assume that an acceptance of the invitation is received (214). Of course, if the user does not accept or does not respond to the invitation, the method terminates at 212.

Assuming that an acceptance of the invitation is received at 214, content related to the set of one or more key terms is provided to the user (216). The user is optionally allowed to provide feedback and/or to opt out of receiving content (218). In some embodiments, the content related to the set of key terms is delivered periodically (e.g., daily, twice per day, hourly, or the like) or episodically (e.g., when relevant content is identified).

The method 200 may include fewer operations or additional operations. Two or more operations may be combined. A position of one or more of the operations may be changed.

In some embodiments, the respective user may pre-approve the use of the user's history information, such as search history information, web browsing history, email messages, and so on, in identifying the set of one or more key terms.

In some embodiments, the user history information that is used to identify sets of key terms includes one or more of the following: the user's search history (i.e., query terms in search queries), web browsing history (e.g., content of web pages visited by the user), email messages, off-line content (such as scanned documents, books, and/or periodicals) read by the user or otherwise associated with the user, the user's bookmarks in an Internet browser, content of one or more blogs written or visited by the user or otherwise associated with the user, content stored on one or more client computers or server computers used by the user, and so on.

The relevant content may be provided to the user (216) using email messages, telephone messages, instant messaging, a Simple Messaging System (SMS) message, a client application (such as a toolbar resident on the respective user's computer), a message sent to or posted on the respective user's web page, a message posted on the respective user's calendar, a Rich Site Summary (RSS) feed, and/or regular mail.

Figure 3:
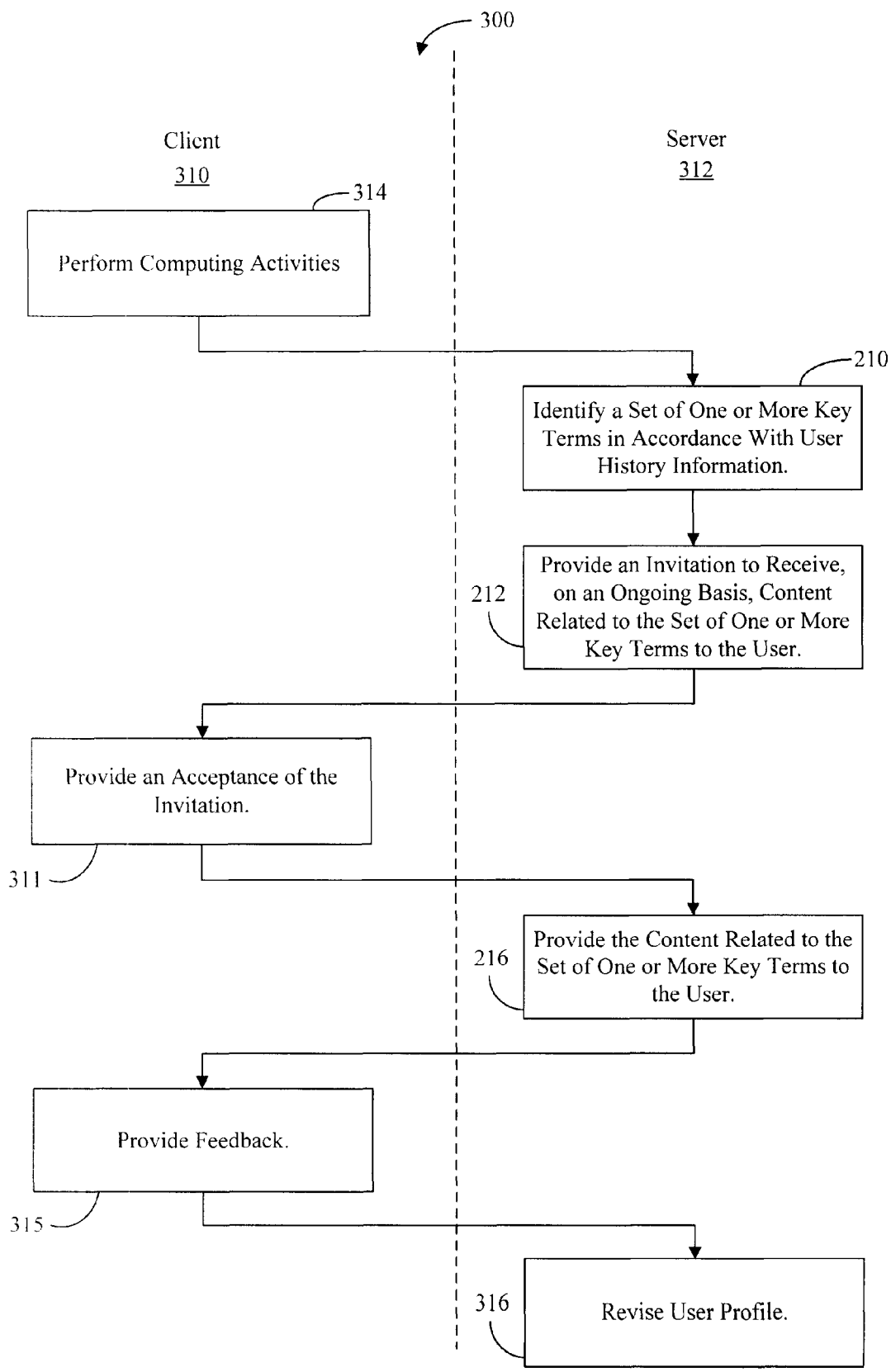
FIG. 3 is a flow diagram illustrating an embodiment of a method of providing a user with content.

FIG. 3 is a flow diagram illustrating an embodiment of a method 300 of providing a respective user with content. The user performs computing activities (314) on a client computer 310. A server computer 312 is used to identify the set of one or more key terms in accordance with user history information of the user (210). The invitation to receive, on an ongoing basis, content related to the set of one or more key terms is provided to the user (212). An acceptance of the invitation is provided (311) by the user at the client computer 310. The content related to the set of one or more key terms is provided to the user (216) by the server computer 312. After receiving the content, the user may optionally provide feedback (315) from the client computer 310. The user profile is revised (316) on the server computer 312 in accordance with the user provided feedback.

When a user declines an alert recommendation, the user's profile may be updated to identify the set of key terms in the recommendation that the user declined. When the user accepts an alert recommendation, the user's profile is updated to add the recommended alert to the user's list of subscribed alerts (864, FIG. 8). Furthermore, the user profile information concerning accepted and declined alert recommendations may be used to modify the selection of sets of key terms for future alert recommendations. Similarly, any user feedback concerning the content delivered in accordance with the user accepted alerts recommendations may be used by the server to modify the selection of sets of key terms for future alert recommendations. Alternately, the user feedback concerning the content delivered in accordance with the user accepted alerts recommendations may be used by the server to modify the process of identifying content related to the sets of key terms in the user accepted alerts recommendations.

In other embodiments, the method 300 may include fewer operations or additional operations. Two or more operations may be combined. A position of one or more of the operations may be changed.

Figure 4:
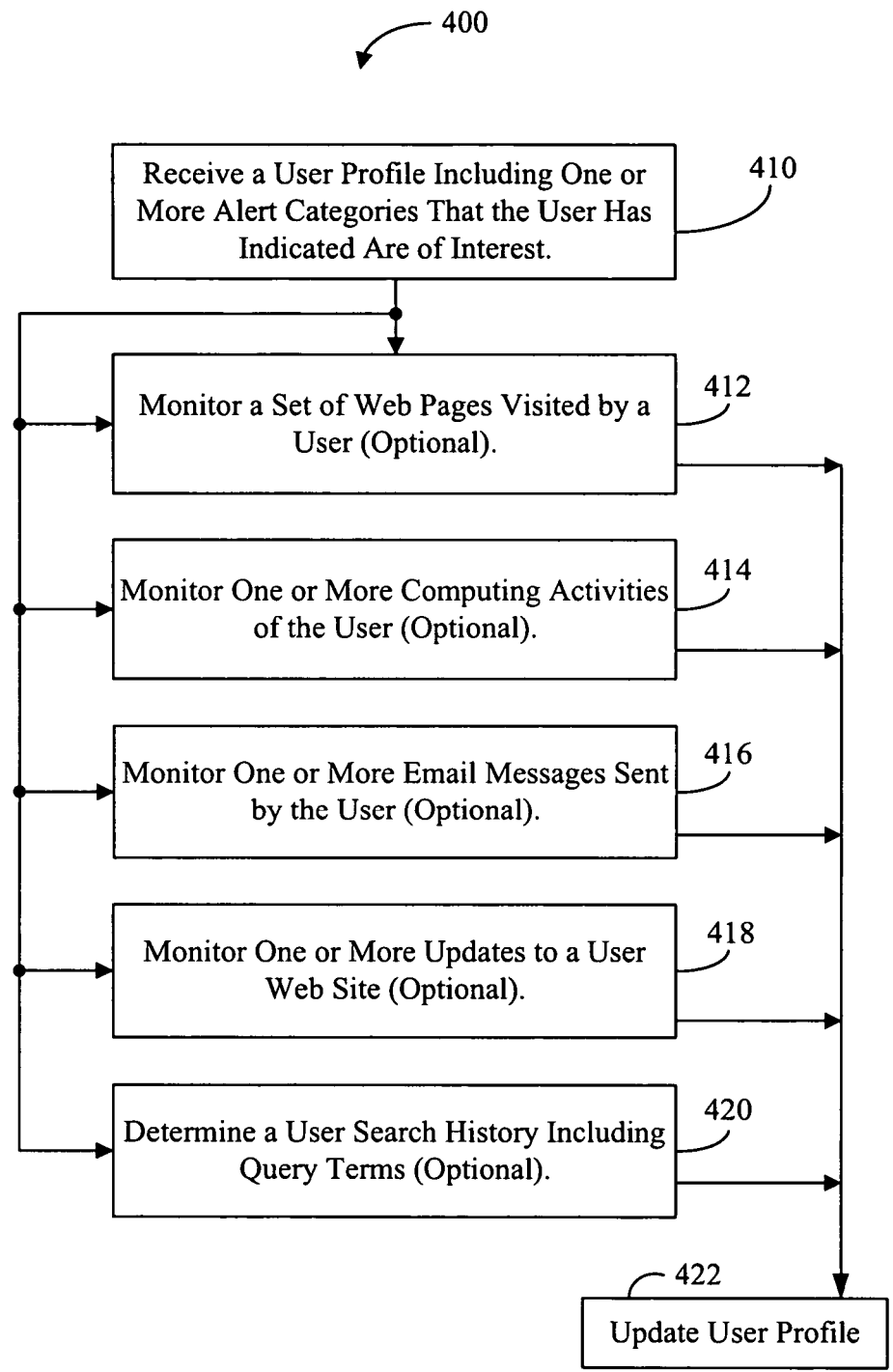
FIG. 4 is a flow diagram illustrating an embodiment of a method of determining computer activities for a user.

FIG. 4 is a flow diagram illustrating an embodiment of a method 400 of determining computer activities for a user. A user profile is received or accessed (410). The user profile includes one or more alert categories that the user has indicated are of interest. One or more of the following operations are performed so as to gather additional information about the user's interests: a set of web pages visited by the user are monitored (412); one or more computing activities for the user are monitored (414); email messages sent by the user are monitored (416); updates to a web site of the user web site are monitored (418); a user search history is determined, including the query terms in the search queries submitted by the user to one or more search engine (420). Information obtained from one or more of these monitoring operations may be used to update the user profile (422). The method 400 may include fewer operations or additional operations. Two or more of the aforementioned operations may be combined. A position of one or more of the operations may be changed.

Figure 5:
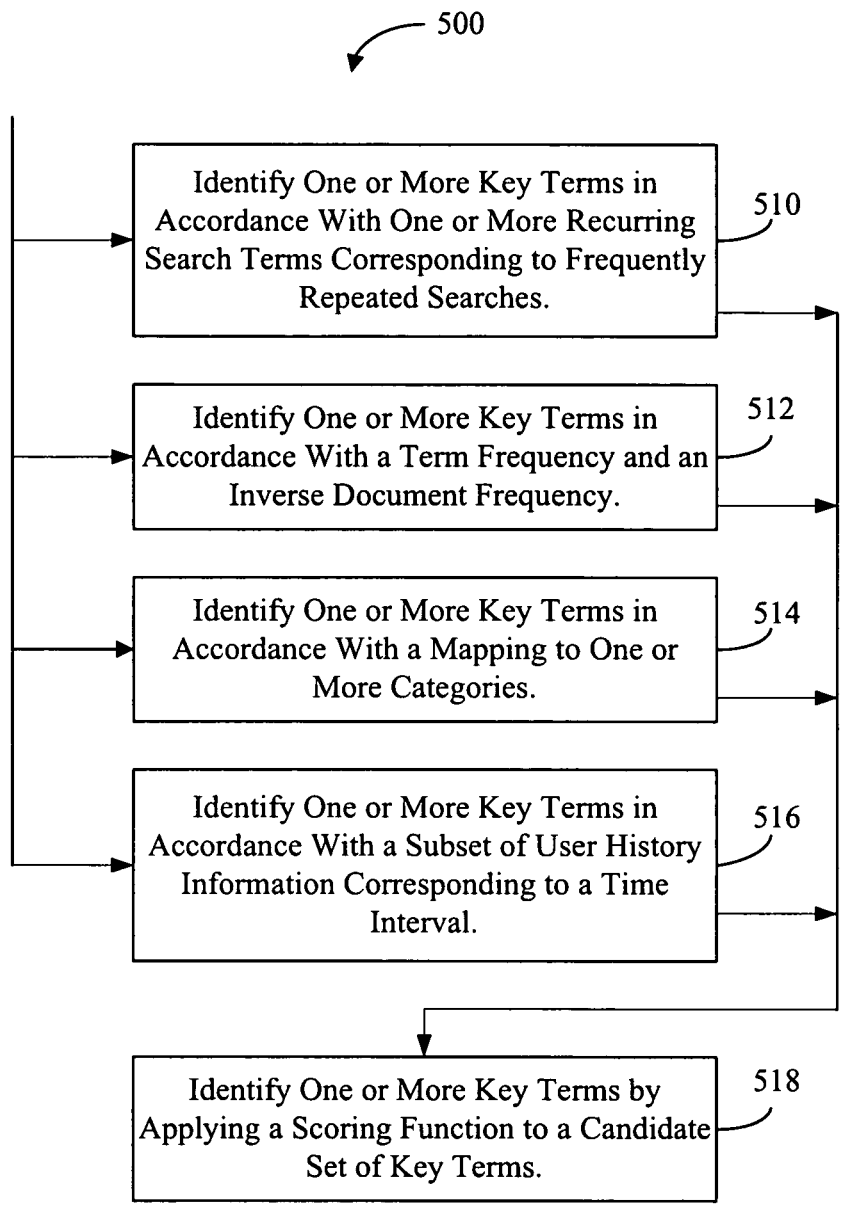
FIG. 5 is a flow diagram illustrating an embodiment of a method of identifying one or more key terms.

FIG. 5 is a flow diagram illustrating an embodiment of a method 500 of identifying one or more key terms for a respective user. The method includes on or more of the operations, 510, 512, 514, and 516, described below. These operations may be used to identify key terms for the user, or they may be used to identify candidate sets of key terms. In some embodiments, the candidate sets of key terms are then processed, by applying a scoring function to each candidate set of key terms to produce one or more scores for each candidate set of key terms, and then identifying one or more of the sets of key terms in accordance with those scores (518).

One or more key terms, or candidate sets of key terms, may be identified in accordance with one or more recurring search terms corresponding to frequently repeated searches of the user (510). For instance, if the user history indicates that the user repeats a particular search (e.g., "Google job openings") every day, the search terms in the repeated search may be identified as key terms.

One or more key terms, or candidate sets of key terms, may be identified by identifying the terms in a set of documents (e.g., web pages visited by the user, email messages, etc.) in accordance with a content score of those terms. By way of example, candidate key terms in a document or other content may be the terms in the document or content having the highest content scores. Criteria for identifying candidate key terms may include a threshold content score (e.g., terms having content scores below the threshold may be excluded from consideration), and may include a limit on the number of candidate key terms identified for any one document or set of documents (e.g., only the terms having the top N content scores may be considered for selection as candidate key terms).

The content score of a term may be based on the term frequency (TF) and inverse document frequency (IDF) of the term (512) in the set of documents (which may also be called "content" associated with the user). The IDF of a candidate term is an inverse of a number documents in the document database in which the candidate term appears. As such, uncommon terms have a larger IDF. Terms having large IDF values are presumed to be more meaningful than terms having smaller IDF values. Term frequency (TF) is the number of times a term appears in a document or other content, or is a value associated with the number of times a term appears in a document or other content (e.g., the term frequency may be assigned a predefined maximum value whenever the term frequency of a term exceeds that predefined maximum value). The "TFIDF" of a candidate term is a value produced by multiplying or otherwise combining the term frequency (TF) and inverse document frequency (IDF) of the candidate term. While this document will sometimes refer to operations performed using TFIDF or IDF as the content score of a candidate term, it is to be understood that in other embodiments a content score or metric other than IDF may be used. In some embodiments, for instance, a dictionary of content scores may be used to assign a content score to each candidate term. Terms not found in the dictionary may be assigned a default content score or may be assigned a content score in accordance with a predefined assignment algorithm.

One or more key terms, or candidate sets of key terms, may be identified by in accordance with a mapping to one or more categories (514). For instance, documents and other content in the user history may be mapped to one or more categories. The key terms in a document may be supplemented by one or more keywords that identify one or more categories. Thus, the keyword "apple" for a particular document may be supplemented by a category keyword such as "computer," "electronics," "food" or "fruit," in accordance with the category identified for the content of the document.

In some embodiments, the one or more key terms identified using operations 510, 512 and/or 514 are identified in accordance with a subset of user history information corresponding to a particular time interval (516). For instance, the time interval may be a predefined time interval, such as the two week interval immediately preceding the current time. Alternately, the time interval (which generally is a time interval immediately preceding the current time) may be determined in accordance with the amount of online activity of the user, with shorter time intervals (e.g., one week) being used for high volume users and longer time intervals (e.g., one month, or even longer) being used for low volume users, and intermediate length time intervals being used for users whose online activity falls between predefined high and low activity levels.

As noted above, one or more sets of key terms are identified from among the one or more candidate sets of key terms (identified by operations 510, 512, 514 and/or 516) by applying a scoring function to a candidate sets of key terms (518) and then selecting the one or more sets of key terms in accordance with the resulting scores. In other embodiments, the method 500 may include fewer operations or additional operations. Two or more operations may be combined.

Figure 6:
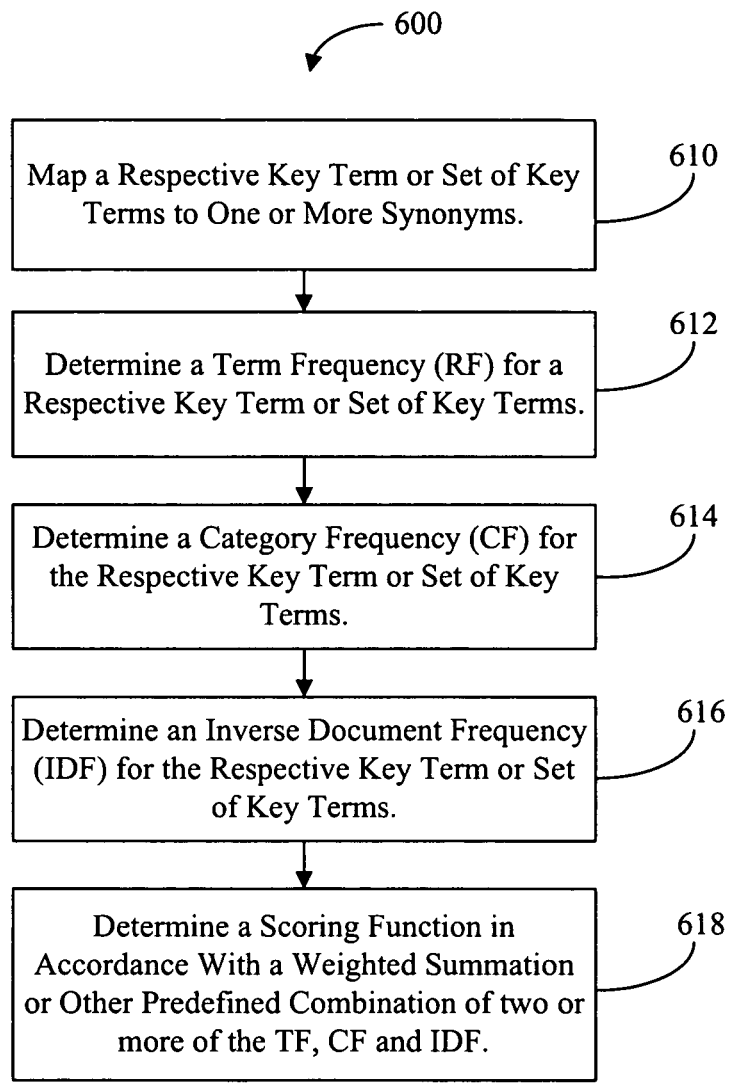
FIG. 6 is a flow diagram illustrating an embodiment of a method of identifying one or more key terms.

FIG. 6 is a flow diagram illustrating an embodiment of a method 600 of identifying one or more key terms. A respective key term or set of key terms is mapped to one or more synonyms (610). A term frequency (TF) for a respective key term or the set of key terms is determined (612). A category frequency (CF) for the respective key term or the set of key terms is determined (614). An inverse document frequency (IDF) for the respective key term or the set of key terms is determined (616) A scoring function is determined in accordance with a weighted summation or other predefined combination of two or more of the term frequency, category frequency and inverse document frequency (618). The method 600 may be repeated for a plurality of candidate sets of key terms, thereby producing a score for each candidate set of key terms. Based on those scores, one or more sets of key terms may be identified, as discussed above. The method 600 may include fewer operations or additional operations. Two or more operations may be combined. An order of the operations may be changed.

As noted above, in some embodiments, method 600 may include a mapping of one or more key terms to one or more related terms, such as one or more synonyms or paraphrases. In a set of key terms, the synonyms or paraphrases of any key terms are logically related to each other by a logical "OR" operation. For example, if a candidate set of key terms includes terms A and B, and term A has synonyms A1 and A2, a search query based on the candidate set of key terms may be presented by the Boolean expression (A OR A1 OR A2) AND B. The scoring function used in operation 618 may therefore by applied to a Boolean expression that represents a candidate set of key terms and any corresponding synonyms.

Attention is now directed towards systems that may utilize and/or implement the methods, such as methods of recommended alerts, described previously.

Figure 7:
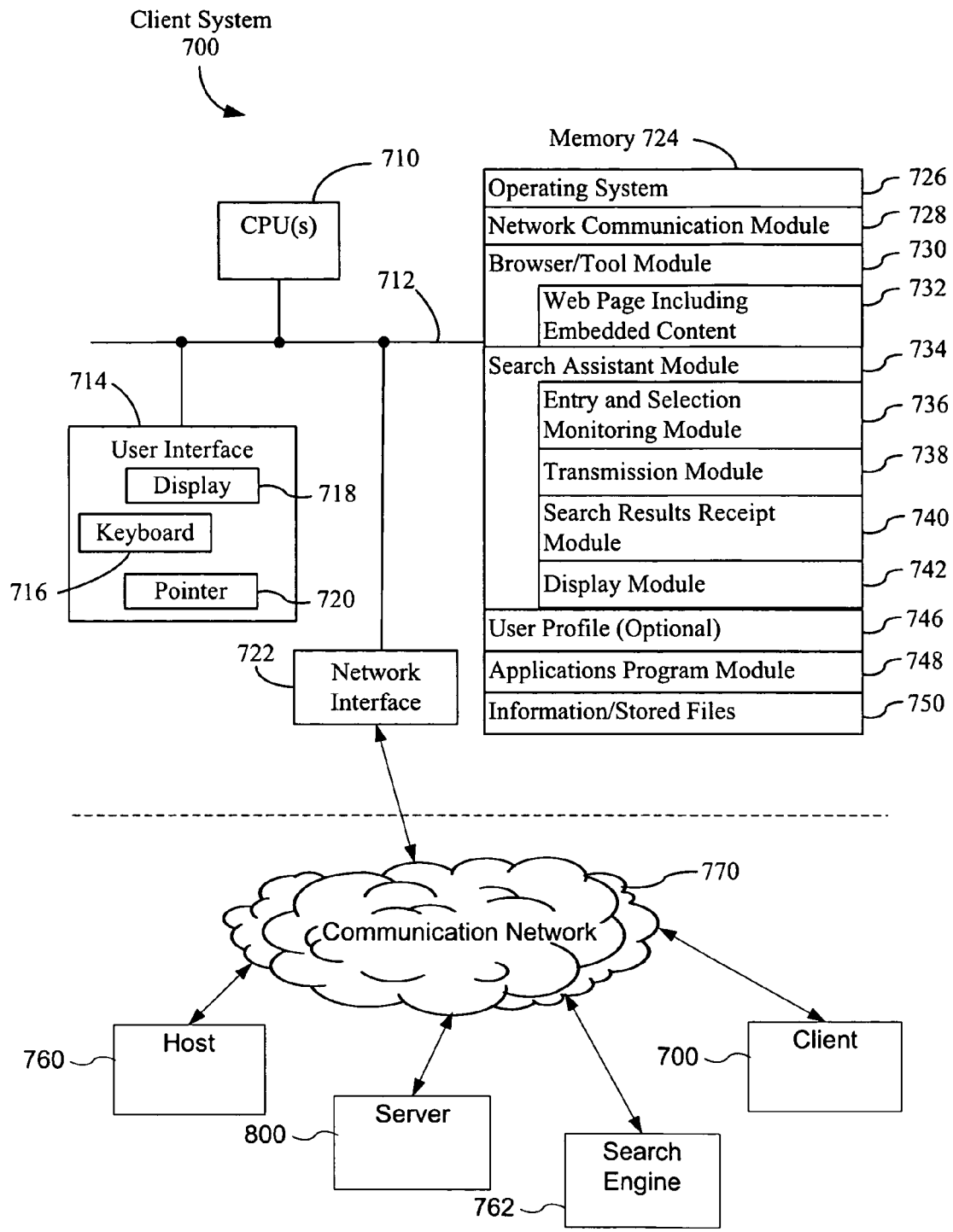
FIG. 7 is a block diagram illustrating an embodiment of a client system.

FIG. 7 is a block diagram of a client system 700, in accordance with some embodiments. The client system 700 generally includes one or more processing units (CPU's) 710, a user interface 714, one or more network or other communications interfaces 722, memory 724, and one or more communication buses 712 for coupling these components. The user interface 714 may have one or more keyboards 716, one or more displays 718, and/or one or more pointers 720, such as a mouse. Memory 724 may include random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The communication buses 712 may include circuitry (sometimes called a chipset) that interconnects and controls communications between system components. Memory 724 may include mass storage that is remotely located from the central processing unit(s) 710.

In some embodiments, memory 724 stores the following programs, modules and data structures, or a subset thereof:
- an operating system 726, such as LINUX, UNIX or WINDOWS, that includes procedures (or sets of instructions) for handling various basic system services and for performing hardware dependent tasks;
- a network communication module 724 that is used for connecting the client 102 to other computers (e.g., other client computers 700, a server 800, and/or a search engine 762) via the one or more communication network interfaces 722 and one or more communication networks (770), such as the Internet, other wide area networks, local area networks, metropolitan area networks, and so on;
- a browser application or module 730 (e.g., a web browser);
- a search assistant module 734 (e.g., a browser extension, a browser toolbar, or instructions embedded in a search engine web page);

an optional user profile 746;
an applications program module 748 (or a set of instructions); and/or
information/stored files 750.

The browser/tool module 730 may be used to display a web page that includes embedded content 732. The search assistant module 734 may include an entry and selection monitoring module 736 for monitoring user input, a transmission module 738 for sending a search query to a search engine, a search results receipt module 740 for receiving search results from the search engine, and a display module 742 for displaying search results, such as a ranking of information items containing identified content corresponding to the search query. In embodiments where the client system 700 is coupled to a local server computer 800, one or more of the modules and/or applications in memory 724 may be stored in the server computer 800, which is typically at a different location than the client system 700.

Each of the above identified modules and applications corresponds to a set of instructions for performing one or more functions described above. These modules (i.e., sets of instructions) need not be implemented as separate software programs, procedures or modules. The various modules and sub-modules may be rearranged and/or combined. Memory 724 may include additional modules and/or sub-modules, or fewer modules and/or sub-modules. For example, the search assistant module 734 may be integrated into the browser/tool module 730. Memory 724, therefore, may include a subset or a superset of the above identified modules and/or sub-modules.

Figure 8:
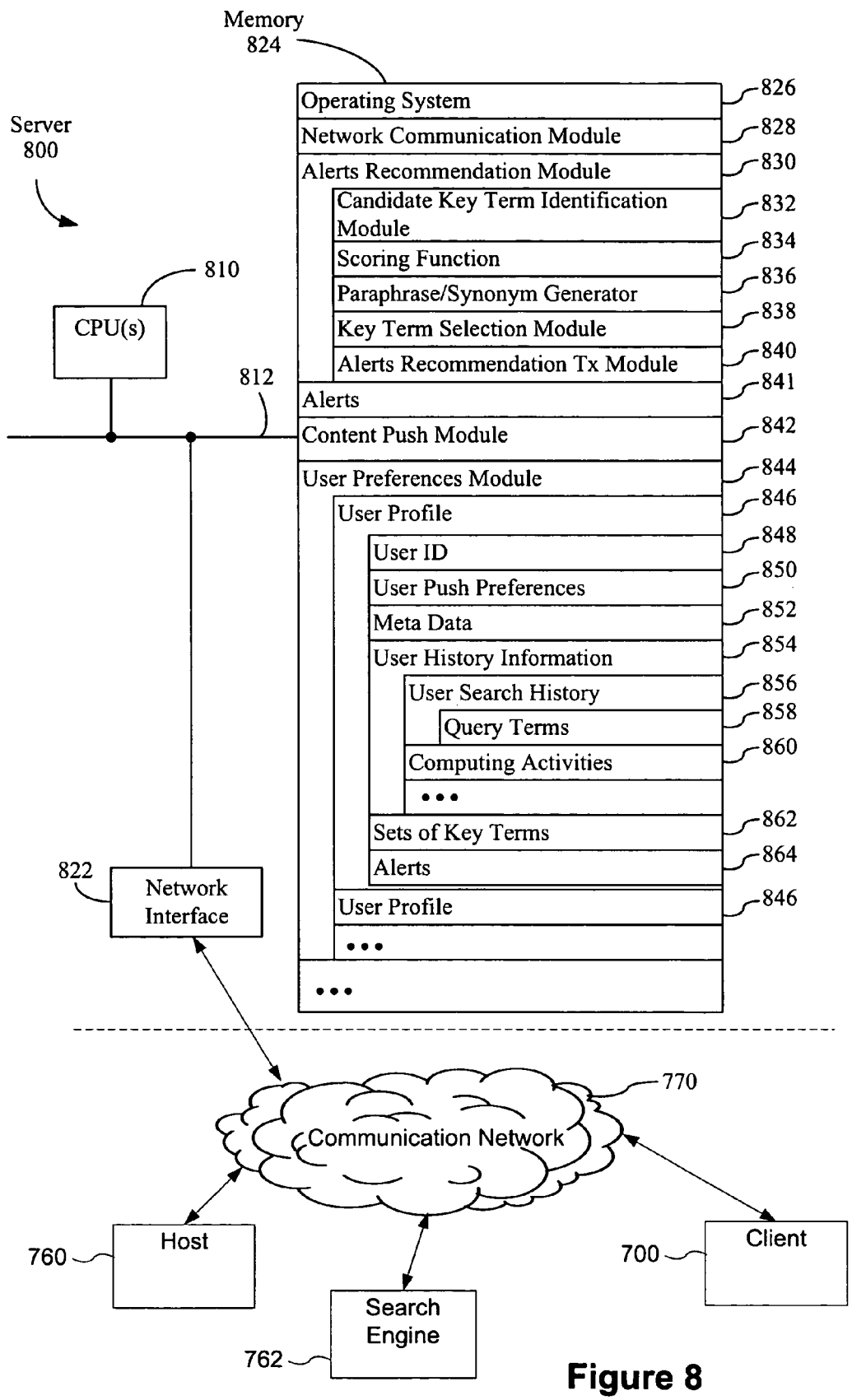
FIG. 8 is a block diagram illustrating an embodiment of a server.

FIG. 8 is a block diagram illustrating an embodiment of a server 800, such as the server 312 (FIG. 3). The server 800 may include at least one data processor or central processing unit (CPU) 810, a communications or network interface 822 for communicating with other computers (e.g., clients, other servers, search engines), memory 824, and one or more communication buses 812 for coupling these components. Memory 824 may include random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The communication buses 812 may include circuitry (sometimes called a chipset) that interconnects and controls communications between system components. Memory 824 may include mass storage that is remotely located from the central processing unit(s) 810. Moreover, memory 824, or alternatively one or more storage devices (e.g., one or more nonvolatile storage devices) within memory 824, includes a computer readable storage medium.

In some embodiments, memory 824 or the computer readable storage medium of memory 824 stores the following programs, modules and data structures, or a subset thereof:
an operating system 826, such as LINUX, UNIX or WINDOWS, that includes procedures (or sets of instructions) for handling various basic system services and for performing hardware dependent tasks;
a network communication module 828 that is used for connecting the server 800 to other computers (e.g., other client computers 700, host computers 760 (e.g., hosts that store content that may analyzed by the server 800), other servers, and/or a search engine 762) via the one or more communication network interfaces 822 and one or more communication networks (770), such as the Internet, other wide area networks, local area networks, metropolitan area networks, and so on;
an alerts recommendation module 830 (or a set of instructions);
a set of established alerts 841;
a content push module 832 (or a set of instructions), for distributing content to users in accordance with the established alerts 841; and
a user preferences module 844, which includes a set of user profiles 846.

The alerts recommendation module 830 implements methods of identifying sets of key terms, which are then proposed to users as recommended alerts, as described above. In some embodiments, the alerts recommendation module 830 includes one or more of the following:
a candidate key term identification module 844 (or a set of instructions), for identifying candidate sets of key terms based on user history information, and optionally other user profile information as well;
a scoring function 834 (or a set of instructions), for assigning scores to candidate sets of key terms;
a paraphrase or synonym generator 836 (or a set of instructions), for identifying synonyms or paraphrases corresponding to candidate sets of key terms;
a key term selection module 838 (or a set of instructions), for selecting or identifying sets of key terms from among the candidate sets of key terms, using one or more of the methods described above; and
an alerts recommendation transmission module 840 (or a set of instructions), for transmitting or otherwise conveying alerts recommendations to users.

The user profiles 846 may each include the following information, or a subset or superset thereof:
a user identifier 848, for identifying the user associated with the user profile 846;
user push preferences 850, which may include information about how the user prefers to receive alert recommendations, how the user prefers to receive alerts (i.e., content related to a subscribed alert), declined alerts, and so on;
meta data 852, which may include demographic information about the user, information about the user's online accounts or activities, client computer(s), etc.;
user history information 854, which may include the user's search history 856 (which may include query terms in the user's search queries, and may also include the URLs of search results that the user viewed);
computing activities information 860, which may include the user's web browsing history, information about the user's email, information about other applications used by the user, or information about the content associated with those applications;
sets of key terms 862, such as the sets of key terms associated with various documents and computing activities; and
alerts 864, which are alerts (i.e., repeatedly executed search queries) to which the user has subscribed.

The meta data 852, user history information 854 and/or computing activities information 860 may include category information. The category information identifies categories of information that are of interest to the user, or which are otherwise associated with documents or content composed, read or accessed by the user.

Each of the above identified modules and applications corresponds to a set of instructions for performing one or more functions described above. These modules (i.e., sets of instructions) need not be implemented as separate software programs, procedures or modules. Various ones of the modules and sub-modules may be rearranged and/or combined.

Similarly, various sets of the information or data identified above may be combined, or stored in different data structures. Memory 824 may include additional modules and/or sub-modules, or fewer modules and/or sub-modules. Memory 824, therefore, may include a subset or a superset of the above identified modules and/or sub-modules.

Although FIG. 8 shows a server, FIG. 8 is intended more as functional description of the various features which may be present in a set of servers than as a structural schematic of the embodiments described herein. In practice, and as recognized by those of ordinary skill in the art, items shown separately could be combined and some items could be separated. For example, some items shown separately in FIG. 8 could be implemented on single servers and single items could be implemented by one or more servers. The actual number of servers used to implement a server and how features are allocated among them will vary from one implementation to another, and may depend in part on the amount of data traffic that the system must handle during peak usage periods as well as during average usage periods.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of providing content to a user, comprising:
on a server including one or more processors and memory for storing one or more programs to be executed by the one or more processors:
identifying a set of one or more key terms in accordance with user history information; and
providing to the user an invitation to receive, on an ongoing basis, content related to the identified set of one or more key terms in accordance with repeated execution of a corresponding search query; and
after receiving an acceptance of the invitation, automatically providing alerts to the user on an ongoing basis, where the alerts include the content related to the identified set of one or more key terms in accordance with repeated execution of the corresponding search query,
wherein providing the invitation to the user comprises sending an invitation message to the user, the invitation message identifying the identified set of one or more key terms.

2. The method of claim 1, wherein the provided content comprises a message containing a link to a web page.

3. The method of claim 1, wherein the identified set of one or more key terms identifies a category of information associated with the user history information.

4. The method of claim 1, wherein the user history information includes a user profile, the user profile including a set of one or more alert categories that the user has indicated are of interest.

5. The method of claim 1, wherein the user history information includes information from a plurality of information sources selected from the set consisting of: a set of web pages visited by the user; the user's search history; off-line content read by the user or otherwise associated with the user; the user's bookmarks in an Internet browser; content of one or more blogs written or visited by the user or otherwise associated with the user; and content stored on one or more client computers or server computers used by the user.

6. The method of claim 1, wherein the identifying is further in accordance with a user search history, the user search history including query terms.

7. The method of claim 1, wherein the identifying is further in accordance with one or more computing activities of the user.

8. The method of claim 7, wherein the one or more computing activities include one or more email messages sent by the user.

9. The method of claim 7, wherein the one or more computing activities includes one or more updates to a user web site.

10. The method of claim 1, wherein the identified set of one or more key terms includes one or more recurring search terms corresponding to frequently repeated searches of the user.

11. The method of claim 1, wherein the identified set of one or more key terms are identified in accordance with a term frequency and an inverse document frequency.

12. The method of claim 11, wherein the identified set of one or more key terms are further identified in accordance with a mapping to one or more categories.

13. The method of claim 1, wherein identifying the set of one or more key terms is in accordance with a subset of the user history information corresponding to a time interval.

14. The method of claim 1, wherein identifying the set of one or more key terms includes applying a scoring function to candidate sets of key terms, and the scoring function is determined in accordance with a weighted summation of a term frequency, a category frequency, and an inverse document frequency.

15. The method of claim 1, wherein the one or more key terms in the identified set of one or more key terms includes Boolean expressions that include synonyms for one or more key terms.

16. The computer-implemented method of claim 1, wherein automatically providing alerts to the user on an ongoing basis includes repeatedly executing the corresponding search query using the identified set of one or more key terms.

17. A computer readable storage medium storing one or more programs for execution by one or more processors, the one or more programs comprising:
instructions for identifying a set of one or more key terms in accordance with user history information; and
instructions for providing to the user an invitation to receive, on an ongoing basis content related to the identifies set of one or more key terms in accordance with repeated execution of a corresponding search query; and
instructions for automatically providing alerts, after receiving an acceptance of the invitation, to the user on an ongoing basis, where the alerts include the content related to the identified set of one or more key terms in accordance with repeated execution of a corresponding search query,
wherein the instructions for providing the invitation to the user include instructions for sending an invitation message to the user, the invitation message identifying the identified set of one or more key terms.

18. The computer readable storage medium of claim 17, wherein the user history information includes information from a plurality of information sources selected from the set consisting of: a set of web pages visited by the user; the user's search history; off-line content read by the user or otherwise associated with the user; the user's bookmarks in an Internet browser; content of one or more blogs written or visited by the user or otherwise associated with the user; and content stored on one or more client computers or server computers used by the user.

19. The computer readable storage medium of claim 17, wherein the instructions for automatically providing alerts to the user on an ongoing basis include instructions for repeatedly executing the corresponding search query using the identified set of one or more key terms.

20. A computer, comprising:
   a memory;
   a processor; and
   a program for archiving content, wherein the program is stored in the main memory and executed by the processor, the program including:
      instructions for identifying a set of one or more key terms in accordance with user history information; and
      instructions for providing to the user an invitation to receive, on an ongoing basis, content related to the identified set of one or more key terms in accordance with repeated execution of a corresponding search query; and
      instructions for automatically providing alerts, after receiving an acceptance of the invitation, to the user on an ongoing basis, where the alerts include the content related to the identified set of one or more key terms in accordance with repeated execution of a corresponding search query,
   wherein the instructions for providing the invitation to the user include instructions for sending an invitation message to the user, the invitation message identifying the identified set of one or more key terms.

21. The computer of claim 20, wherein the user history information includes information from a plurality of information sources selected from the set consisting of: a set of web pages visited by the user; the user's search history; off-line content read by the user or otherwise associated with the user; the user's bookmarks in an Internet browser; content of one or more blogs written or visited by the user or otherwise associated with the user; and content stored on one or more client computers or server computers used by the user.

22. The computer of claim 20, wherein the instructions for automatically providing alerts to the user on an ongoing basis include instructions for repeatedly executing the corresponding search query using the identified set of one or more key terms.

23. A computer, comprising:
   a memory means;
   a processor means; and
   a program mechanism for archiving content, wherein the program mechanism is stored in the memory means and executed by the processor means, the program mechanism including:
      instructions for identifying a set of one or more key terms in accordance with user history information; and
      instructions for providing to the user an invitation to receive, on an ongoing basis, content related to the identified set of one or more key terms in accordance with repeated execution of a corresponding search query; and
      instructions of automatically providing alerts, after receiving an acceptance of the invitation, to the user on an ongoing basis, where the alerts include the content related to the identifies set of one or more key terms in accordance with repeated execution of a corresponding search query,
   wherein the instructions for providing the invitation to the user include instructions for sending an invitation message to the user, the invitation message identifying the identified set of one or more key terms.

24. The computer of claim 23, wherein the user history information includes information from a plurality of information sources selected from the set consisting of: a set of web pages visited by the user; the user's search history; off-line content read by the user or otherwise associated with the user; the user's bookmarks in an Internet browser; content of one or more blogs written or visited by the user or otherwise associated with the user; and content stored on one or more client computers or server computers used by the user.

25. A computer-implemented method on a server including one or more processors and memory for storing one or more programs to be executed by the one or more processors, comprising transmitting an invitation to receive, on an ongoing basis, content related to a computer-identified set of one or more key terms in accordance with repeated execution of a corresponding search query, wherein the identified set of one or more key terms is identified in accordance with the user history information; and after receiving an acceptance of the invitation, automatically transmitting alerts on an ongoing basis, where the alerts include the content related to the identified set of one or more key terms in accordance with repeated execution of a corresponding search query, wherein transmitting the invitation comprises sending an invitation message to the user, the invitation message identifying the computer-identified set of one or more key terms.

26. The computer-implemented method of claim 25, wherein the user history information includes information from a plurality of information sources selected from the set consisting of: a set of web pages visited by the user; the user's search history; off-line content read by the user or otherwise associated with the user; the user's bookmarks in an Internet browser; content of one or more blogs written or visited by the user or otherwise associated with the user; and content stored on one or more client computers or server computers used by the user.

* * * * *

UNITED STATES PATENT AND TRADEMARK OFFICE
CERTIFICATE OF CORRECTION

PATENT NO.         : 8,799,302 B2                                                              Page 1 of 1
APPLICATION NO.    : 11/323870
DATED              : August 5, 2014
INVENTOR(S)        : Singerman et al.

It is certified that error appears in the above-identified patent and that said Letters Patent is hereby corrected as shown below:

In the Claims

Claim 17, col. 10, lines 50 and 51, please delete "the identifies set" and insert --the identified set--; and Claim 23, col. 12, line 9, please delete "instructions of automatically" and insert --instructions for automatically--; and Claim 23, col. 12, line 12, please delete "the identifies set" and insert --the identified set--.

Signed and Sealed this
Twenty-first Day of October, 2014

Michelle K. Lee
*Deputy Director of the United States Patent and Trademark Office*